(No Model.)

J. B. WRIGHT.
GRAIN SOWER.

No. 303,246. Patented Aug. 5, 1884.

WITNESSES:
H. B. Brown
A. G. Lyne

INVENTOR:
J. B. Wright
BY Munn & Co.
ATTORNEYS.

UNITED STATES PATENT OFFICE.

JOHN B. WRIGHT, OF RIDGE'S CREEK, NORTH CAROLINA.

GRAIN-SOWER.

SPECIFICATION forming part of Letters Patent No. 303,246, dated August 5, 1884.

Application filed October 30, 1883. (No model.)

*To all whom it may concern:*

Be it known that I, JOHN BUNYAN WRIGHT, of Ridge's Creek, in the county of Montgomery and State of North Carolina, have invented a new and useful Improvement in Grain-Sowers, of which the following is a full, clear, and exact description, reference being had to the annexed drawings, forming part of this specification.

This invention relates to wheel-operated grain-sowers; and it consists of the novel construction hereinafter described and claimed.

Figure 1:
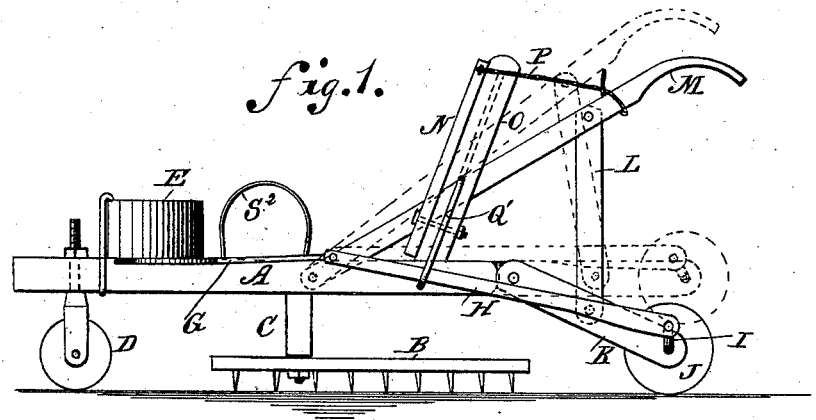
Figure 2:
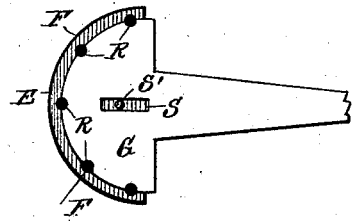
Figure 3:
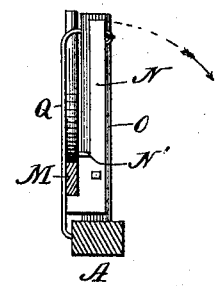

In the drawings, Figure 1 is a side elevation of my improved grain-sower, and Figs. 2 and 3 are detail views.

A indicates a draft-beam, which is pivoted to the front end of the harrow B by a pin, C. The forward end of the beam A is supported on a caster, D, and carries a hopper, E, having holes F in its bottom, and a slide, G, arranged thereunder, and connected by a pitman, H, to a crank, I, which is rotated by the wheel J, supported in a supplemental beam or frame, K, which is pivoted to the rear end of the beam A. The beam or frame K is pivoted to the beam A, in order that it may be supported above ground when the dropping-slide is not to be operated. As a means of lifting and supporting the beam K in a raised position, it is connected by a bar, L, to the handle M, which latter is pivoted to the beam A, and a catch, N, is pivoted to a standard, O, on the beam A, and is provided with a shoulder, N', adapted to engage with the under side of the handle and hold it in a raised position. A cord, P, is connected to the upper end of catch N, passed around one side of the standard O, and connected to the handle M, in convenient position for being drawn by the driver to pull the catch from under the handle, and allow the wheel J and beam K to fall to proper working position. The catch may be provided with a spring, if desired, for causing it to engage automatically with the handle when the latter is lifted. The handle M and pitman H are provided with guards Q Q', respectively.

The hopper E is preferably made semicircular in horizontal section, and the slide G is to be of corresponding shape. The semicircular edge of the slide is provided with notches R, corresponding to the holes F. The notches or slots R are preferred to holes in the slide, because they will not stop the grain from falling through the holes F, except when the slide is at the end of its closing-stroke. In this manner the grain is partially drilled or strewed along the ground. The slide is provided with a guide-slot, S, placed in engagement with pin S' in the hopper, and a spring, S², which tends to move and hold the slide in position for closing the holes F in the hopper as soon as the wheel J is lifted from the ground. The holes F are to be provided with removable open circular plates, the openings in which are to be of such sizes as are required for the kind of grain being sown.

Instead of the harrow, the object of which is to cover the grain, any other suitable covering device may be used.

What I claim is—

The combination of the harrow, the pivoted beam, the supplemental beam pivoted thereto and carrying the driving-wheel, the lifting-handle, catch, and cord, the semicircular hopper, and notched spring-actuated slide, substantially as shown and described.

JOHN BUNYAN WRIGHT.

Witnesses:
C. C. WADE,
Z. T. WRIGHT.